Jan. 7, 1936.  C. W. LA MARSH  2,027,278
LOADING AND UNLOADING SHELF STRUCTURE
Filed Jan. 5, 1935   2 Sheets-Sheet 1
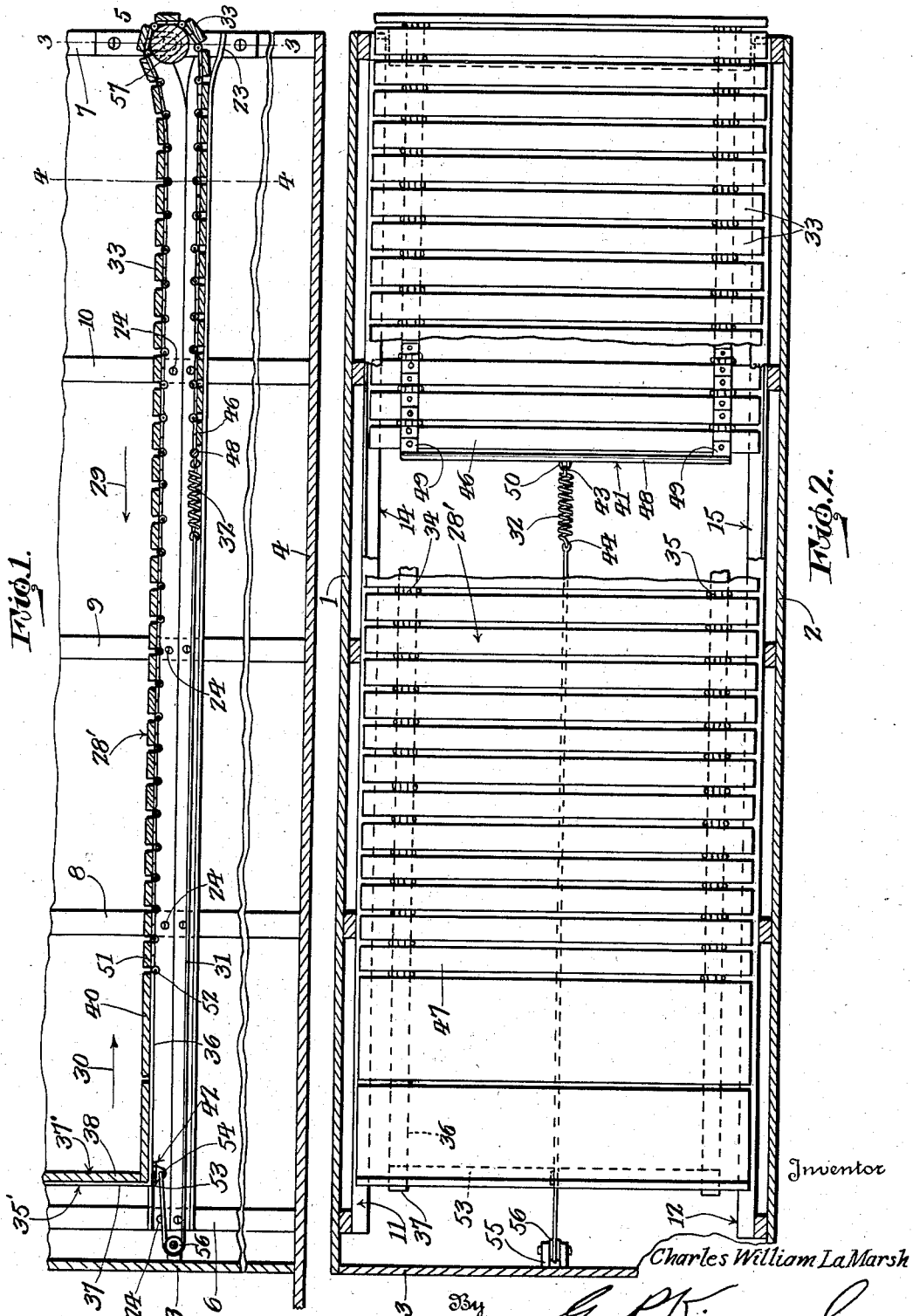
Inventor
Charles William LaMarsh
By Geo. P. Kimmel
Attorney Jan. 7, 1936.   C. W. LA MARSH   2,027,278
LOADING AND UNLOADING SHELF STRUCTURE
Filed Jan. 5, 1935   2 Sheets-Sheet 2
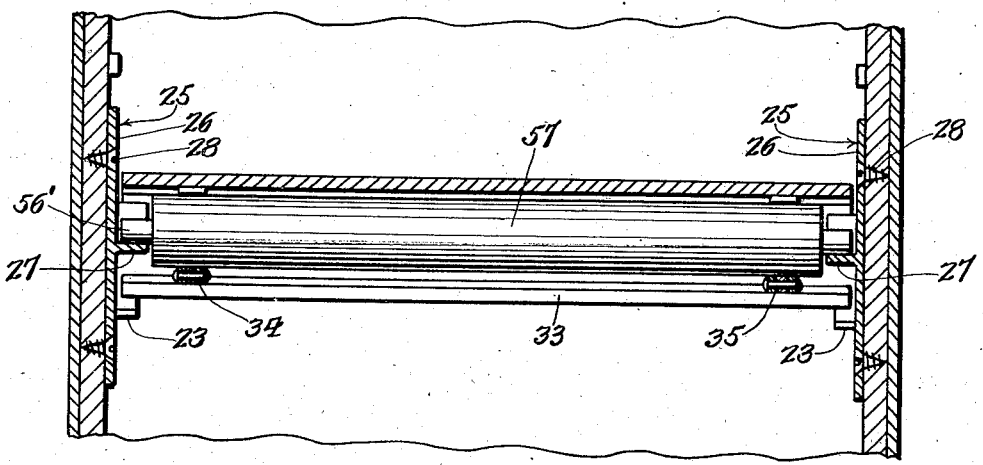
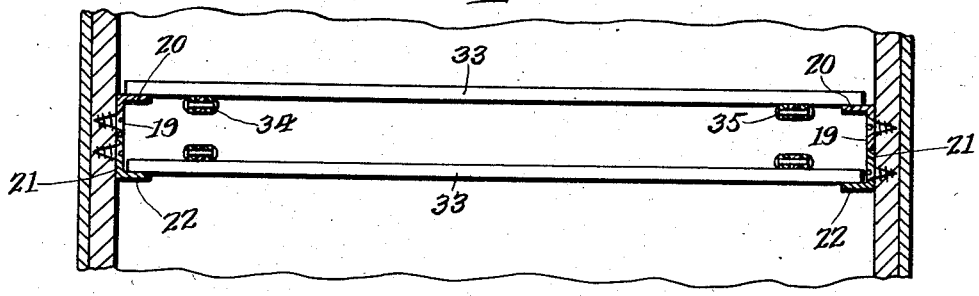
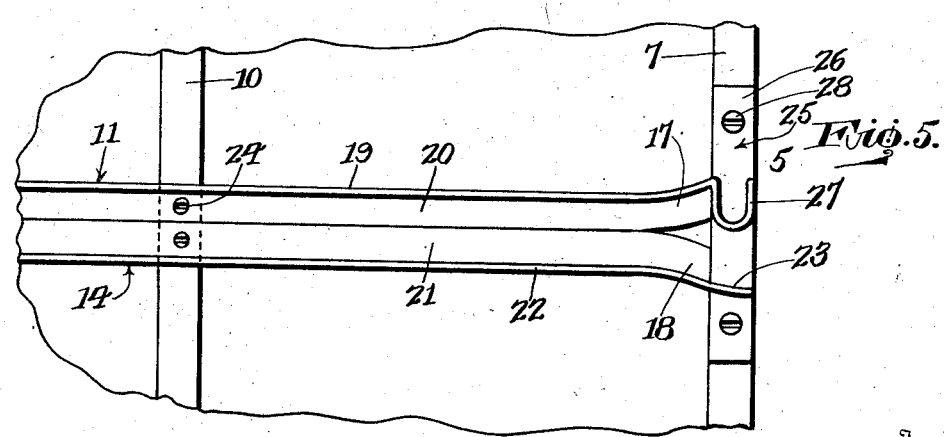
Inventor
Charles William LaMarsh
By Geo. P. Kimmel
Attorney Patented Jan. 7, 1936

2,027,278

UNITED STATES PATENT OFFICE 2,027,278

LOADING AND UNLOADING SHELF STRUCTURE

Charles William La Marsh, Alton, Ill.

Application January 5, 1935, Serial No. 574

3 Claims. (Cl. 214—82)

This invention relates to a loading and unloading shelf structure designed primarily for use in connection with haulage vehicles, more particularly closed body trucks, but it is to be understood that a shelf structure, in accordance with this invention, is to be employed in any connection for which it may be found applicable, and the invention has for its object to provide, in a manner as hereinafter set forth, for expeditiously loading articles or objects to be transported upon a truck and for expeditiously unloading the articles or objects from off the truck when occasion requires.

To the above ends essentially and to others which may hereinafter appear, the invention consists of such parts and such combination of parts which fall within the scope of the invention as claimed.

In the drawings:

Figure 1 is a longitudinal sectional view of the shelf structure showing the adaptation thereof with respect to the closed body of a truck, Figure 2 is a sectional plan of the body of a truck showing the adaptation therewith of the shelf structure, Figures 3 and 4 are respectively sectional views on lines 3—3 and 4—4, Figure 1, Figure 5 is a fragmentary view in elevation of an upper and a lower track member, and Figure 6 is a fragmentary sectional detail of the shelf structure.

Referring to the drawings, 1, 2 indicate the sides, 3 the front, 4 the bottom and 5 the rear end of a closed body truck. The rear end 5 may be open or may have associated therewith a shiftable closure therefor. Secured against the inner face of each side of the truck body is a row of spaced parallel upstanding ribs. Each of said rows of ribs includes a forward end rib 6 spaced from the front 2, a rear end rib 7 arranged at the rear end of the side 1 and a plurality of intermediate ribs 8, 9 and 10.

The shelf structure includes a pair of spaced parallel oppositely disposed track members 11, 12 coacting to provide an upper track. A pair of oppositely disposed spaced parallel track members 14, 15 coacting to provide a lower track. The track members 11, 12 having upwardly curved rear end portions 17. The track members 14, 15 having downwardly curved rear portions 18. The portions 17 extend in an opposite direction with respect to the portions 18. The track members 11, 12 are formed of vertical legs 19 and horizontal legs 20 extending inwardly at right angles to the upper ends of the vertical legs. The track members 14, 15 are formed of vertical legs 21 and horizontal legs 22 extending inwardly at right angles to the vertical legs 21. The horizontal legs 22 are of greater length than the vertical legs 21 to provide extension 23 projecting beyond the rear ends of the said vertical legs 21. The vertical legs 19 of the members 11, 12 have their bottom edges, for the major portion of their length abut the top edges of the vertical legs 21 of the members 14, 15 for the major portion of the length of the latter. The vertical legs 19, 21 and the horizontal legs 20, 22 of the track members are flush at their forward ends with the forward side edges of the ribs 6. The vertical legs 19, 21 of the track members are anchored to the ribs 1, 8, 9 and 10 by the holdfast means 24.

Secured to the ribs 2 are a pair of oppositely disposed parallel brackets 25 (Figure 3), each consisting of a vertically disposed oblong base 26 having arranged thereon, adjacent each end thereof, a vertically disposed U-shaped combined bearing and hanger element 27 for a purpose to be referred to. Holdfast means 28 are provided for anchoring the brackets 25 to the ribs 2. The rear end portions 17 of the track members 11, 12 abut the forward side edges of the bases 26 adjacent the inner sides of the elements 27. The vertical legs 21 of the track members 14, 15 abut the forward side edges of the bases 26 adjacent the inner sides of elements 27. The extensions 23 of the horizontal legs 22 project across the bases 26 below and in spaced relation to the bottoms of elements 27.

Travelling upon the upper and lower tracks is an endless conveyor element 28' disposed lengthwise of the truck body travelling on the upper and lower tracks and capable of having its upper stretch shifted in the direction of the arrow 29 when employed for loading and in the direction of the arrow 30 when unloading.

The conveyor element includes a flexible section 31 in the form of a cable, a resilient section 32 in the form of a coiled spring, a foldable section in the form of a series of spaced parallel narrow slats 33 hinged together in proximity to their ends as at 34, 35 and constituting a support, a combined abutment and supporting section consisting of a pair of spaced parallel angle shaped straps 35' each having a horizontal leg 36 and a vertical leg 37, a sectional angle shaped member 37' having a vertical section 38 and a horizontal section 39 upon which seats the section 38 and a horizontally disposed flat plate 40 and coupling sections 41 and 42.

The sections 32, 41 and 42 are of materially less length than that of any one of the other sections of the conveyor. The section 31 is of less length than that of the foldable section, but of greater length than that of the abutment section. The foldable section of the conveyor is of greater length than that of any one of the other sections of the conveyor. The sections 41 and 42 are of less length than section 32.

The section 32 has each end formed with an eye and which is designated 43, 44. The leaves 45 of the hinges 34, 35 are anchored against the inner face of the slats 33. The outer slats of the series of slats 33 are designated 46, 47. The section 41 consists of a rounded bar 48 of less length than a slat 33. The bar 48 at each end has a flat lateral extension 49 and which are anchored to the inner face of slat 46 whereby the foldable section and section 41 are coupled together. The bar 48, centrally thereof, has a laterally extending eye 50 which is connected to eye 46 of section 32 whereby the latter and section 32 are coupled together. A pair of spaced hinge members 51 are secured to the inner face of slat 41. The members 51 are pivotally connected, as at 52, to the rear ends of the horizontal legs 36 of the straps 35' whereby the foldable and abutment sections are hinged together. The section 42 is in the form of a horizontally disposed flat bar 53 connecting the forward ends of the horizontal legs 36 of the straps 35' together. The bar 53, centrally thereof, is formed with an eye 54 to which one end of section 31 is anchored whereby the abutment section is coupled to section 31.

The vertical section 38 of member 37' is of greater thickness than section 39 of the latter. The thickness of section 39 and plate 40 corresponds to that of the slats of the foldable section of the conveyor. The sections 38, 39 of member 37' are anchored respectively to the legs 37, 36 respectively of the straps 35'. These latter are spaced adjacent to the side edges of member 37'.

The horizontal section 39 of member 37' and the plate 40 of the abutment section of the conveyor travel upon the upper track only. The slats of the foldable section of the conveyor travel upon the upper and lower tracks.

Anchored to the inner face of front 3 of the truck body is a rearwardly extending bracket 55 carrying a rotatable pulley 56. The latter is disposed centrally with respect to the track members at a point above the lower track and below the upper track. The section 31 of conveyor element 28 travels around pulley 55. Revolubly mounted in the combined bearing and hanger elements 27 are the ends of a shaft 56' carrying the roller 57, positioned to oppose the upper portion of the opening formed between the curved portions 17 of the upper track and the curved portions 18 of the lower track. The foldable section of the conveyor element travels around the roller 57. The arrangement of roller 57 relative to the tracks is such that the rear portion upper stretch of the conveyor element 28, when loading, will travel downwardly from roller 57 and when unloading the said rear portion will travel upwardly. This lowers the article when loading and elevates the article for removal when unloading.

When loading the conveyor element 28 is shifted in a direction whereby plate 40 of the abutment section will be arranged in close relation to the roller 57. The object or article will be loaded upon the abutment section of element 28. On successively loading the objects or articles on said stretch the conveyor will be shifted in the direction of the arrow 29 until the section 38 of member 37' abuts or is positioned in close proximity to the front 3 of the truck body. When unloading the upper stretch of the conveyor is shifted in the direction of the arrow 30. The section 32 functions to maintain the conveyor or element taut.

What I claim is:

1. A loading and unloading shelf structure, comprising an upper and a lower track, said upper track having its rear end portion upwardly curved towards its rear terminus, a roller revolubly supported at the rear ends of said tracks, a pulley supported at the forward ends of said tracks, and a conveyor element including a foldable section travelling around said roller and upon said tracks and a section in the form of a cable travelling over said pulley and travelling between said tracks.

2. In a loading and unloading shelf structure, a shiftably supported endless conveyor including an upstanding abutment section of angle form, a foldable section formed of a series of parts hinged together, a resilient section, a flexible section in the form of a cable, and a pair of coupling sections, one of said coupling sections being carried by and depending from the bottom of the abutment section for connecting one end of the cable to the abutment section centrally of one end of the latter, the other of the said coupling sections including a horizontal bar fixed to an end part of the foldable section having centrally thereof a forwardly extending means for connecting one end of the resilient section thereto, said resilient section and said cable having coacting means at their other ends for connecting them together, and the other ends of the abutment section and foldable section having coacting means for hinging them together.

3. In a loading and unloading shelf structure for arrangement within a truck body, upper and lower track forming means adapted to be anchored to the sides of and arranged within the truck body, said upper track forming means having its rear end portion extending upwardly, said lower track forming means having its rear end portion extending downwardly, a revoluble roller adapted to be supported from the sides of the truck body at the rear end of the latter, said roller being located between the said rear end portions, the periphery of the body of said roller being spaced a greater distance from the downwardly extending rear end portion than from the upwardly extending rear end portion, a pulley adapted to be suspended rearwardly from the inner face of the front of and within the truck body, a sectional support in the form of a series of slats hinged together for travelling upon said tracks and around said roller, a cable travelling around said roller, a combined abutment and support travelling upon said upper track and hinged at its rear end to the forward end of the sectional support, means for connecting the forward end of said cable to the forward end of said combined abutment and support and a resilient element connected at one end to the rear end of the cable and having its other end connected with the rear end of the sectional support.

CHARLES WM. LA MARSH.